Patented Oct. 5, 1954

2,691,050

UNITED STATES PATENT OFFICE 2,691,050

PROCESS FOR PREPARING 1,2,3,4,5,6-HEXACHLOROCYCLOHEXANE

Pieter Goenee, Schalkhaar, and Pieter Lucas Stedehouder, Deventer, Netherlands, assignors to Koninklijke Industrieele Maatschappij Voorheen Noury & Van Der Lande N. V., Deventer, Netherlands, a corporation of the Netherlands No Drawing. Application April 25, 1949, Serial No. 89,562

13 Claims. (Cl. 260—648)

The present invention deals with the chlorination, by addition, of benzene, to produce hexachlorocyclohexane, in a relatively pure condition. Heretofore various proposals have been made for accomplishing said reaction, but in most of the prior processes, a substantial amount of chlorination by substitution is effected, giving mixtures which are less suitable for manufacturing insecticidal preparations owing to impurities.

The preparation of 1.2.3.4.5.6. hexachlorocyclohexane by adding chlorine to benzene under the influence of radiation, say by electric lamps (e. g. incandescent lamps or ultra-violet lamps), is generally known and is frequently used.

However, the installation and the operation of the illuminating system are expensive, and the operation of these lamps constitutes a fire- and explosion-hazard.

The process according to U. S. Patent 2,010,841, seems not entirely suitable for practical use on a large scale. As a consequence of the large heat of reaction it is difficult to avoid losses of chlorine and to restrict said losses a rather expensive and complicated device is needed in order to cool the reaction vessel or to again liquefy the evaporated chlorine.

For overcoming losses of chlorine, and to render the known processes safe and effective, it is essential that the reaction heat be removed, and that the temperature of the reaction mass be kept down. Especially if the reaction is carried out in such a way, that large quantities of benzene are converted within a short time, the proper, prompt and efficient removal of the reaction heat is a very difficult problem. It cannot be economically effected by external cooling of the reaction vessels or even by means of internally located cooling coils in the reaction vessels. It should be noted that with such fast processes iron or steel equipment must be used, but such equipment is subject to attack and corrosion, especially if moisture is present, which is usually the case in this process, but the application of coatings or linings to prevent corrosion usually lowers the heat conductivity of the iron or steel. Moreover, in operating the chlorination of benzene, a substantial part of the desired chlorination product may form in crystals on the cooling surfaces of the chlorination vessel or the coils, which mass of crystals causes a further lowering of the heat conductivity. Besides the crystals are often difficult to separate from the said surfaces.

The present invention has reference to an effective and economical process for producing 1,2,3,4,5,6 hexachlorocyclohexane, by direct chlorination of benzene.

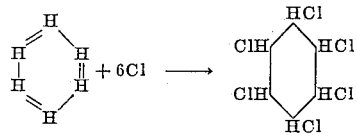

The equipment needed for this process is simple. No illumination system is required. No cooling installations around or within the reaction vessels are required. In some cases even a stirrer is not necessary though most often the presence of a stirrer is advantageous as will appear later on in this specification.

As there is no cooling system there is no need for keeping the surface of the reaction vessels relatively large, which means that now vessels may be used having a much larger volume. Hence the invention is particularly advantageous for chlorinating benzene in large batches.

The chlorination process may be carried out within a very short time. Substitution is practically avoided which means that the yield of the hexachlorocyclohexane with respect to the chlorine which is introduced, is very high. The products obtained are very pure and have a large content of the valuable gamma isomer. Moreover, the crude mixture of hexachlorocyclohexane isomers which is obtained without purification is a hard product which does not cause any difficulties in grinding when insecticidal preparations are manufactured from said mixtures and suitable carrier materials in a well-known way, whereas usually complicated precautions are necessary when insecticidal preparations are manufactured in this way from crude mixtures of hexachlorocyclohexane isomers.

In the new process, the benzene and chlorine are brought together in the presence of water and a basic substance soluble in water, in a reaction vessel all without intentional illumination, the process being carried out in such a way as to substantially completely avoid chlorination by substitution and to avoid undesirable temperature rises in the reacting materials, the heat of reaction being neutralized by conversion largely into latent heat.

The chlorination is to be effected in an iron or steel container, which may advantageously have an enamel lining.

According to the present invention at least 50% by weight of the total water used is added in the form of ice.

The sequence in which the various substances which together form the reaction mixture, are introduced into the reaction vessel may be varied. However, when chlorine is passed in, water in both liquid and solid condition and the basic substance must already be present. Benzene may be added later on, the chlorine is partly bound by the basic substance, to form hypochlorite. Besides an addition compound of chlorine and water, a so-called chlorine hydrate appears to be formed.

The amount of chlorine, which may be bound in these two ways, is pretty large. This bound chlorine also appears to take part in the main chlorination reaction. However, the yield of hexachlorocyclohexane may be highly increased if during the reaction chlorine is again passed in. It is, however, simpler and therefore preferred to introduce chlorine only when benzene is already present, so that the desired addition reaction occurs at once.

Directly after chlorine has been passed in, a drop in the temperature of a few degrees is observed. This may be ascribed to the fact that the reaction products of the basic substance and chlorine, i. e. chloride and hypochlorite, cause a large depression of the freezing point of water.

It is generally more convenient to pass in the chlorine in liquid condition, though gaseous chlorine may be used as well. The energy content of liquid chlorine is lower than that of gaseous chlorine by an amount equal to the heat of evaporation. It may be assumed that both liquid and gaseous chlorine pass over into the same reactive state before they act upon benzene. For this conversion more energy is needed in the case of liquid chlorine and this amount of energy is furnished by the chemical reaction heat. Hence the cooling of the reacting mass is improved.

With a view to the cooling it is also of interest not to add the basic substance in solid condition but in solution. This is particularly important when basic substances are used, such as sodium or potassium hydroxide, which have a large positive heat of solution.

If the basic substance is omitted also conversion of benzene takes place to some extent. However, the yield is then very poor.

Of course, there is no objection to the added basic solution already containing chlorine. Hence, e. g. a solution of sodium hypochlorite may be used or a solution containing both sodium hydroxide and hypochlorite.

The water or aqueous solutions to be added preferably should not possess a too high temperature, as this would influence the cooling in a detrimental way. The heat of reaction, which is liberated with the chlorination of benzene, is rather large. This heat of reaction is consumed to a large extent by the melting of the ice, which is present when the process is carried out. If owing to other causes a part of the ice melts before the main reaction a larger quantity thereof has to be added or the reaction should be interrupted earlier because the temperature will rise rapidly.

The benzene becomes solidified when it has come into touch with the ice and water. It is remarkable that the solid benzene yet reacts very fast. If chlorine is introduced into a reaction vessel in which already ice, caustic soda solution and benzene are present in a favourable proportion, the whole reaction process may be brought to an end in 10 to 15 minutes. This means that then the point is reached, when the absorption of chlorine by the reaction suddenly becomes very small, so that further introduction of chlorine is not profitable, and would produce the undesirable substitution reaction. At this moment the thermometer usually shows a temperature of 30°–40° C. There is still a rise of about 10° after the introduction of chlorine is interrupted.

A conversion of 80% to 90% of the original quantity of benzene into hexachlorocyclohexane, may be reached. In some cases, however, it is advantageous to add a larger quantity of benzene. In doing so less solid hexachlorocyclohexane may be obtained and a larger quantity of a solution of said substance in benzene. This may be of interest for the further working up.

It is also possible to add the chlorine more slowly so that the reaction is accomplished e. g. in 30 to 60 minutes.

In most instances ice may be introduced into the reaction vessel in a coarsely ground condition. Generally the lumps of ice may be larger as the total quantity of the substances which are brought together in the reaction vessel is larger. Thus if the total quantity of ice is about 500 kg. then preferably no lumps of ice should be introduced which are heavier than 0.5 kg. If the production of hexachlorocyclohexane by this invention is carried out on a small scale, finely crushed ice should best be used.

In order to get a favorable distribution of the substances throughout the vessel, care may be taken that ice and solid benzene are present in alternating layers. In practice, however, all ice may usually be added at once and the liquid benzene run in, without any inconvenience.

Stirring may be completely omitted in the process according to the invention. However, it is to be recommended to stir during the latter part of the reaction process and to continue doing so for a short time after the introduction of chlorine has been stopped. By this means a conversion even of the last traces of chlorine is brought about. Leading a current of air through the reaction vessel, to remove said last traces of free chlorine may then be omitted.

With uncommon compositions of the reaction mixture, especially if a proportionately small quantity of benzene has been added, practically all of which is to be chlorinated, it may be desirable to begin stirring earlier and to stir somewhat more vigorously.

After the reaction has come to an end there is solid hexachlorocyclohexane with a larger or smaller quantity of a benzenic solution thereof accumulated in the lower part of the vessel and there is an aqueous layer in the upper part. If a large surplus quantity of benzene has been used, solid hexachlorocyclohexane may be absent, i. e. all of the hexachlorocyclohexane may be dissolved in the excess of benzene added. The surplus quantity of benzene may be removed from the vessel (or from the mixture of benzene and hexachlorocyclohexane, in a separate vessel) by steam distillation. It is, however, advantageous to use a reaction vessel which may be emptied by an opening in the bottom. The opening should be larger as more of the solid substance is formed. With the drainage the aqueous solution may already for the main part be collected separately and in this way be removed from the hexachlorocyclohexane. It is also possible firstly to remove the aqueous solution by means of a syphon.

Good results are obtained, if at least 75% of weight of the water to be present during the reaction, are introduced in the form of ice. Preferably, however, at least 90% of weight of the water are introduced as ice. The most favorable yields are obtained if 100 parts by weight of ice are brought together with 1-1.3 parts by weight of sodium hydroxide or the equivalent quantity of potassium hydroxide (previously dissolved in 2-3 parts by weight of water and the solution cooled before introduction), 12-100 parts by weight of benzene and 25-30 parts by weight of chlorine. The fact that a large surplus quantity of benzene may be added without any inconvenience was already mentioned. Of course, the upper limit cannot be stated as accurately as the lower limit. However, the limit of 100 parts by weight, which is given here, indicates fairly well how large the surplus may be.

If the vessel is provided with a drainage opening in the bottom the reaction may also be carried out continuously. In the continuous process, hexachlorocyclohexane, in solid condition and dissolved in benzene, is regularly removed and so is the surplus quantity of the aqueous solution. Ice, benzene and cold concentrated alkali solution are added regularly. Preferably the introduction of chlorine is interrupted during filling and draining. It is to be preferred always to stir with this continuous preparation process. Care should be taken that the temperature does not exceed 10°-20° C. during the whole process.

The invention may be illustrated by means of the following examples, to which the invention is not limited.

Example I

In a mild steel vessel, 100 kg. of cold chopped ice were brought together with 30 litres (26.37 kg.) of benzene and 25 litres of 5% sodium hydroxide solution. During 15 minutes 33 kg. of liquid chlorine were introduced, and the introduction of chlorine then stopped. After about 5 more minutes, when temperature had risen to 46° C. compressed air was blown through the vessel for removing unconverted chlorine. The quantity of chlorine which was expelled in this way may on account of rough determinations be estimated at about 1 kg. After that the surplus quantity of benzene was for the main part removed by steam distillation. The lower layer, consisting of hexachlorocyclohexane with a very small quantity of benzene left behind, was after the end of the steam distillation in a viscous liquid condition owing to the high temperature. It was easily removed from the vessel. After drying the yield was found to be 39 kg. of practically pure hexachlorocyclohexane.

Example II

Into a mixture of 300 kg. of coarsely ground ice, 140 l. of benzene and 10 l. of 29% sodium hydroxide solution (cold), 85 kg. of liquid chlorine were introduced during half an hour. The temperature rose finally to 46° C. By means of compressed air the small quantity of unconverted chlorine was removed just as in the case of Example I. The lower layer of benzene and hexachlorocyclohexane was drained off. After cooling down, the crystallized mass was sucked dry on a suction filter. This solid portion weighed about 68 kg. after drying. The filtrate contained about 45 kg. of hexachlorocyclohexane, and this latter was found to be especially rich in the gamma isomer.

Example III

Into a mixture of 28 kg. of ice, 7.5 l. of benzene and 1 l. of 30% sodium hydroxide solution, gaseous chlorine was introduced while stirring at such a rate that no chlorine escaped. When after 45 minutes practically no more chlorine was absorbed, the introduction of chlorine was stopped. At that moment about 8 kg. of chlorine had been absorbed. The final temperature was 45° C. In the way indicated in Example I, the surplus quantity of benzene was removed by means of steam distillation. The viscous residue was cooled while stirring, to about 15° C., dried and ground. Yield 10 kgs.

Example IV

Into a mixture of 600 kgs. of ice, 70 l. of benzene and 100 l. of 6% sodium hydroxide solution (cold), liquid chlorine was rapidly introduced under vigorous stirring until no more was absorbed. The final temperature was 46° C. After steam-distillation of the surplus quantity of benzene and cooling, the residue was sucked off, washed and dried (191 kgs.). 7.2 liters of benzene were recovered.

If stirring would be omitted with such a proportionately small quantity of benzene, there would be inclusion of benzene in the hexachlorocyclohexane, so that less benzene would be converted.

Example V

By introducing chlorine into a mixture of 10 kgs. of finely ground ice and 2.5 liters of 5% sodium hydroxide solution, a mixture of chlorine-hydrate, ice and a hypochlorite solution was prepared. To this chlorinated mixture 0.7 liter of benzene was added while stirring. After the reaction was ended the surplus quantity of benzene and the water were distilled off by introducing superheated steam. Hexachlorocyclohexane was washed and dried (1.1 kg.).

Example VI

Into a mild steel enamel lined kettle having an inner volume of 1 cubic meter, were successively introduced 600 kgs. of coarsely ground ice, 20 l. of 28% sodium hydroxide solution and 180 l. of benzene. The kettle then was closed. There was, however, a conduit for letting out air.

Through an introduction tube which ended just above the bottom of the kettle and of which the lower 80 cm. (i. e. the end portion) had a diameter of 5 cm., liquid chlorine was injected with a great velocity. The tube was to this end connected with two large cylinders of chlorine, the taps of which were turned widely open.

During the first few minutes the temperature fell to —4° C., thereafter a temperature rise occurred, slow at first but faster rather soon. After 11 minutes the temperature had risen to 36° C. and introduction of chlorine was stopped, because some chlorine gas began to escape through the air outlet conduit. At that moment 174 kgs. of chlorine had been added. After 3 more minutes, the final temperature of 49° C. was reached. By means of an air current the unconverted chlorine was eliminated. The contents of the vessel were pressed over into an iron stirring kettle. Hexachlorocyclohexane was isolated by steam distillation of the surplus benzene, sucking off through a filter and drying in a warm air current. 226 kgs. of a beautiful white product were obtained.

Example VII

At first the procedure was the same as described in Example VI. However, 8 minutes after starting the introduction of the chlorine, when the temperature had risen to 10° C., a stirrer was put into action. The further progress of the reaction process was not influenced thereby very much. The final temperature was 48° C. The total quantity of chlorine introduced amounted to 176 kgs. However, introduction of air could now be omitted, since practically no free chlorine was present.

Through a tap hole in the bottom of the kettle the contents were tapped off, most of the aqueous layer being collected separately. The rest (i. e. what had been the bottom layer in the reaction vessel) was purified by means of steam distillation, sucking off and drying in the same way as described in Example VI. Yield 235 kgs.

It will be noted that in all the above examples, more than 90% of all the water is added in the form of ice. This ice in melting keeps the temperature of the reaction mass down to the low temperatures indicated. The chlorine is preferably used in the form of liquid chlorine, which also helps to keep the temperature down. This feature is of importance in preventing any substantial amount of chlorination by substitution.

The purity of the products was checked by titration with alcoholic potassium hydroxide solution. This titration is based upon the formation of trichlorobenzene from hexachlorocyclohexane while three mols of hydrogen chloride per mol are split off, which hydrogen chloride is bound by the potassium hydroxide. At room temperature only the beta isomer is not decomposed thus making possible a separate determination of said isomer. Under heating all the isomers are decomposed so that the total quantity may be determined. In all the cases described in the examples 99–100% of the theoretical quantity of potassium hydroxide was bound. The beta content always lay in a small range around 18%.

The gamma content was at first estimated on the results of biological experiments at about 15%. This estimation was confirmed by the results which were obtained with a cryoscopic method, a modification of the method described by C. V. Bowen and M. A. Pogorelskin in "Analytical Chemistry" of April 1948, pp. 346–8. These determinations also led to values in the near neighborhood of 15%.

What is claimed is:

1. A process for preparing 1.2.3.4.5.6 hexachlorocyclohexane by chlorination of benzene without the need of exposure to radiation, in which water, a basic substance soluble in water, benzene and chlorine are brought together in a vessel, characterized in that substantially over 50% of weight of the total amount of water is initially introduced in the form of ice.

2. A process according to claim 1, characterized in that chlorine is introduced when water in solid and liquid condition as well as the basic substance and the benzene are already present.

3. A process according to claim 1, in which the total chlorine is introduced continuously after all the other substances, including benzene, and in which all of the chlorine is introduced into the reaction mixture within a period of from 10 to 60 minutes.

4. A process according to claim 1, in which at least a part of the chlorine is introduced in the liquefied condition, and in which all of the chlorine is introduced into the reaction mixture within a period of from 10 to 60 minutes.

5. Process according to claim 1, characterized in that a ready formed alkali hypochlorite is also added to the mixture, before adding the chlorine.

6. Process according to claim 1, characterized in that at least 75% by weight of the water is introduced in the form of ice, such chlorine being introduced within a period of between 10 and 60 minutes, and such introduction of chlorine being continuous.

7. Process according to claim 1, characterized in that at least 90% by weight of the water is introduced in the form of ice, and the chlorine is introduced continuously.

8. Process according to claim 1, characterized in that in the reaction vessel are brought together 100 parts of ice, a cold solution of 1 to 1.3 parts of sodium hydroxide, in 2 to 8 parts of water, 12 to 100 parts of benzene and 25 to 30 parts of chlorine.

9. Process according to claim 1, characterized in that the chlorine is continuously injected into the vessel in liquid condition, into the mixture of ice, alkali solution and benzene, the introduction being stopped at the moment when the rate of absorption of the chlorine has substantially fallen, whereas the introduction is performed with such a rapidity that this moment is reached within 10 to 20 minutes after the commencement of the introduction of such chlorine.

10. A process of producing benzenic solutions of hexachlorocyclohexane to be used in the manufacture of insecticidal preparations which comprises introducing into a reaction vessel, ice, benzene, liquid chlorine and an alkali solution, substantially more than three quarters of the total water so introduced being introduced in the form of ice, allowing said materials to react together, and agitating the mixture in said reaction vessel, at least during the latter part of the reaction period, allowing the reaction mixture to settle into layers and separating the benzenic layer from the aqueous layer.

11. A process of producing benzenic solutions of hexachlorocyclohexane to be used in the manufacture of insecticidal preparations which comprises introducing into a reaction vessel, ice, benzene, liquid chlorine and an alkali solution, substantially more than three quarters of the total water so introduced being introduced in the form of ice, said introduction of said chlorine being continuous, allowing said materials to react together, and agitating the mixture in said reaction vessel, at least during the latter part of the reaction period, allowing the reaction mixture to settle into layers and separating the benzenic layer from the aqueous layer and from crystals of solid hexachlorocyclohexane, the quantity of benzene having been chosen in such a way that substantially all of the gamma isomer remains in solution whereas large quantities of other isomers, including the alpha isomer, crystallize on cooling down to room temperature.

12. A process of producing hexachlorocyclohexane to be used in the manufacture of insecticidal preparations which comprises introducing into a reaction vessel, ice, benzene, liquid chlorine and an alkali solution, substantially more than three quarters of the total water so introduced being introduced in the form of ice, said introduction of said chlorine being continuous, allowing said materials to react together, and agitating the mixture in said reaction vessel, at least during the latter part of the reaction period, discontinuing the introduction of such liquid chlorine promptly when chlorine begins to escape from the reaction mixture, thereafter discontinuing the agitation of the reaction mixture, and allowing the reaction mixture to settle into layers and separating the benzenic layer from the aqueous layer and from crystals of solid hexachlorocyclohexane, and distilling the major part of the benzene present in the benzenic solution, to leave solid hexachlorocyclohexane.

13. A process according to claim 1, in which the chlorine is continuously introduced in a liquid condition into a mixture of ice, basic substance dissolved in water and benzene, and that such introduction of chlorine is stopped as soon as the speed of absorption of chlorine has substantially slowed down.

References Cited in the file of this patent

UNITED STATES PATENTS

| Number | Name | Date |
| --- | --- | --- |
| 2,010,841 | Bender | Aug. 13, 1935 |
| 2,474,590 | Morey | June 28, 1949 |

OTHER REFERENCES

Mathews, "Chem. Soc. Journal, Transactions," vol. 59, pages 165–7 (1891).

Fieser, "Experiments in Organic Chemistry," pages 215–6 (1935).

Krarasch et al., "Jour. of Org. Chem.," vol. 6, pages 812, 816–7 (1941).